United States Patent [19]

Owen

[11] Patent Number: 4,947,739

[45] Date of Patent: Aug. 14, 1990

[54] HOME SODA DISPENSING SYSTEM

[75] Inventor: Charles R. Owen, Maumelle, Ark.

[73] Assignee: Charlie O Company, Inc., Oklahoma City, Okla.

[21] Appl. No.: 311,769

[22] Filed: Feb. 17, 1989

[51] Int. Cl.[5] .......................... A23F 3/00; B67D 5/60

[52] U.S. Cl. .......................... 99/323.2; 141/14; 141/18; 141/98; 222/132; 261/DIG. 7; 261/64.1; 261/121.1

[58] Field of Search .................... 99/275, 323.1, 323.2, 99/323.3; 261/DIG. 7, 121.1, 64.1; 222/132, 131, 399; 141/14, 18, 98; 137/505.11

[56] References Cited

U.S. PATENT DOCUMENTS

| | | | |
|---|---|---|---|
| 1,258,964 | 3/1918 | Vodrsanger | 222/132 |
| 2,220,146 | 11/1940 | Curry | 99/323.1 |
| 2,805,846 | 9/1957 | Dewan | 99/323.1 |
| 3,353,717 | 11/1967 | Edwards | 222/132 |
| 3,953,550 | 4/1976 | Gilbey | 426/477 |
| 4,292,368 | 10/1981 | Bodenbender . | |
| 4,294,367 | 10/1981 | . | |
| 4,294,369 | 10/1981 | Racine . | |
| 4,294,370 | 10/1981 | Toeppen . | |
| 4,294,410 | 10/1981 | Gueret . | |
| 4,295,583 | 10/1981 | Schurr . | |
| 4,295,584 | 10/1981 | Borowitz . | |
| 4,342,710 | 8/1982 | Adolfsson | 99/323.1 |
| 4,637,441 | 1/1987 | Gomersall | 141/18 |

OTHER PUBLICATIONS

Brochure entitled "The 6 Cent Soda in Six Easy Steps," 1981 (No Month).

*Primary Examiner*—Robert W. Jenkins
*Attorney, Agent, or Firm*—Stephen D. Carver

[57] ABSTRACT

A home carbonation system for producing soft drinks. A high pressure $CO_2$ vessel comprises a regulator valve assembly which provides fail safe venting, a refill capability, and a low pressure output. It may be interconnected via a fill hose to a seltzer dispenser comprising a multifunction discharge valve secured to a plastic bottle. A plurality of syrup bottles, each filled with a different flavor of concentrate, enable the mixing of desired soda flavors. A storage rack efficiently houses the pressure vessel, the seltzer bottle, and the individual syrup containers. A pressure vessel housing box includes an offset nest which conveniently stores the fill tube. The seltzer bottle is reinforced by a two-piece, vented, anti-fragmentation shroud equipped with inspection slots for enabling proper mixing. The discharge valve is threadably coupled to the bottle, and it includes a gas inlet orifice for receiving low pressure gas from the regulator assembly. Charging gas admitted into the discharge valve is conducted beneath the liquid level by an internal siphon tube, and the vigorous bubbling which results in visible through the inspection slots. The discharge valve, which need not be removed from the bottle for subsequent dispensing of charged water, includes a manually operated lever adapted to trigger its internal valve elements for dispensing fluid from the seltzer bottle through an adjacent output tube, which vigorously squirts charged water into the awaiting users' glass.

88 Claims, 8 Drawing Sheets

FIG. 1
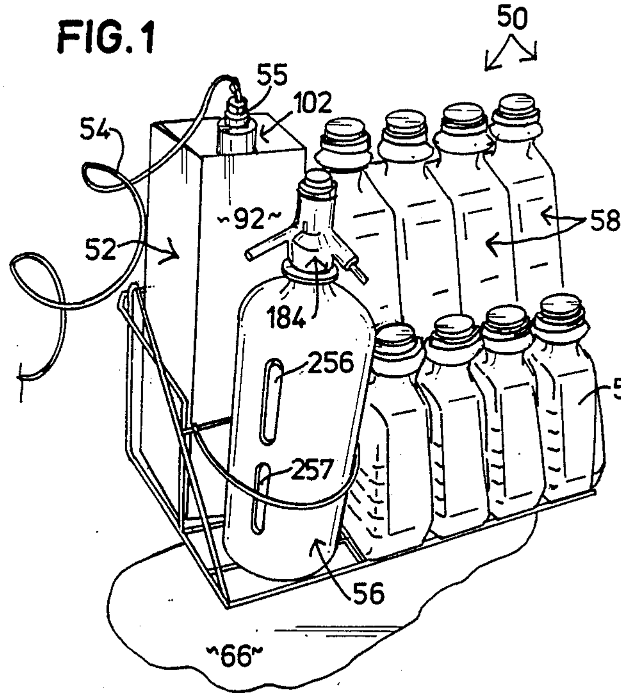
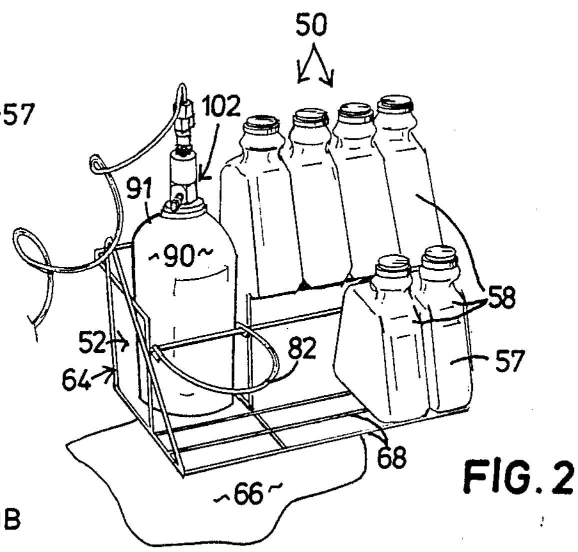
FIG. 2
FIG. 3
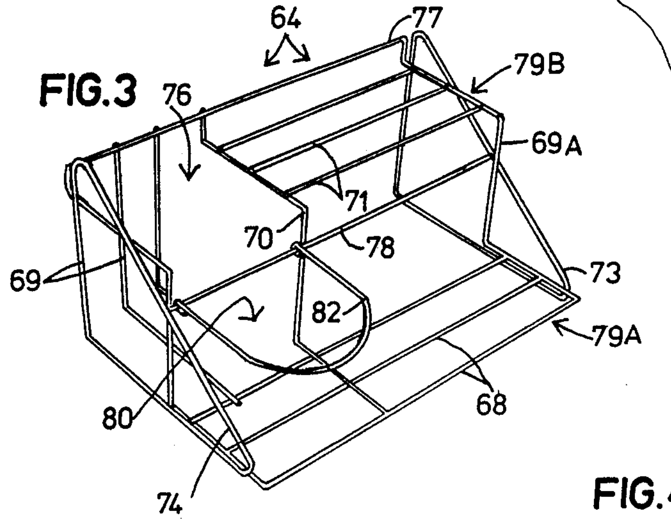
FIG. 4
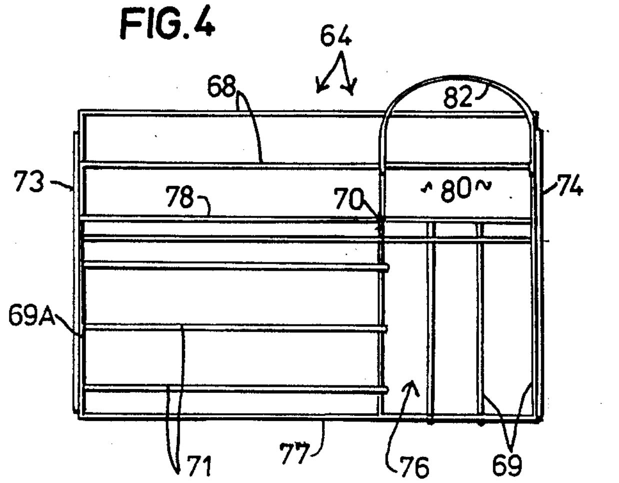

FIG. 6
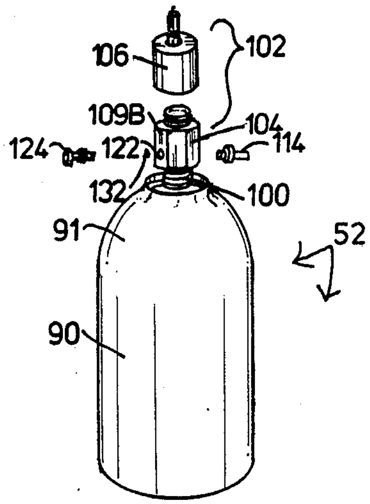
FIG. 7
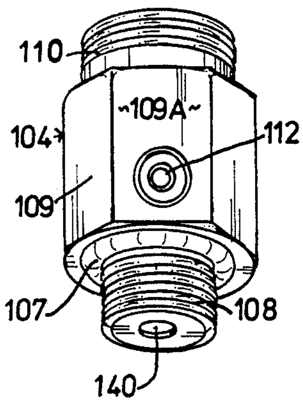
FIG. 8
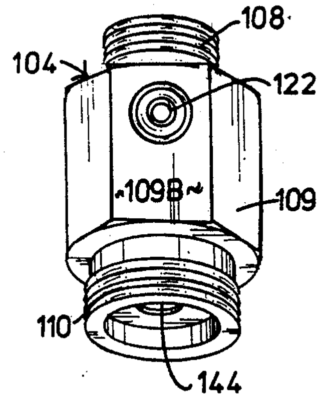
FIG. 9
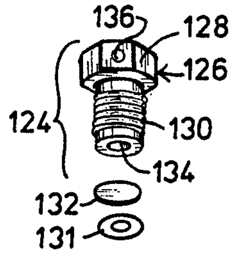
FIG. 10
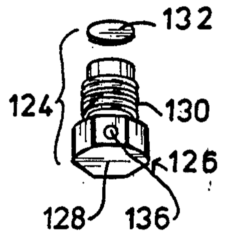
FIG. 15
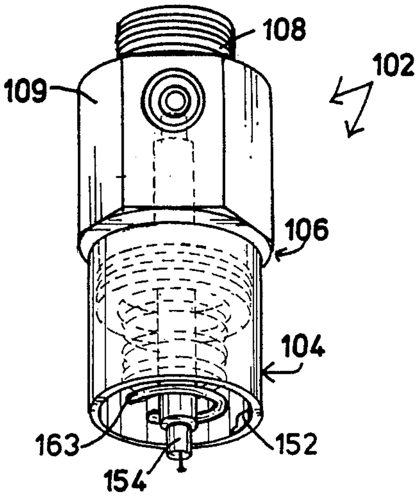
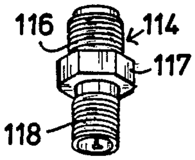
FIG. 11
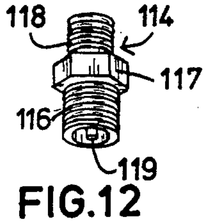
FIG. 12
FIG. 13
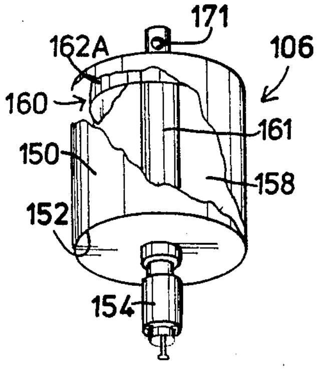
FIG. 14
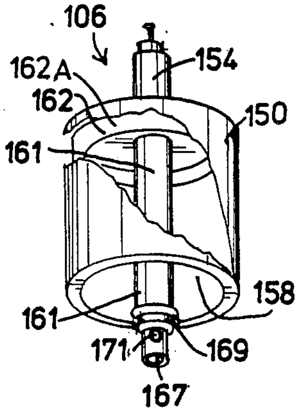

HOME SODA DISPENSING SYSTEM

BACKGROUND OF THE INVENTION

The present invention relates generally to soda fountains for preparing carbonated beverages. More particularly, the present invention is directed to an integrated, self contained system for first generating carbonated water by charging a seltzer system, and thereafter dispensing and mixing seltzer with a syrup concentrate to produce desired carbonated beverages. The invention is believed to be appropriately classified in United States Class 261, subclasses 121 or digest 7, and/or United States Class 222, subclass 491.

The prior art is literally replete with a variety of carbonation systems for preparing and dispensing carbonated beverages. A wide variety of devices exist for carbonating or charging seltzer arrays for use in commercial establishments such as restaurants and taverns, and certain prior art devices aimed at the home market exist. The rather complex and expensive commercial systems used in service establishments are impractical for use in a typical home kitchen. For example, known commercial systems are bulky, overly complex and prohibitively expensive. Usually their installation requires tradesmen such as electricians or plumbers. For these and other reasons the desirability of a practical carbonation system for home use has been recognized in the past, and a number of previously issued patents relate to such equipment.

For example, U.S. Pat. No. 4,298,551, issued Nov. 3, 1981 provides a home appliance for making aerated beverages. It comprises a casing which interiorly mounts a pressurized carbon dioxide vessel for suitably pressurizing an adjacently disposed seltzer bottle to be charged. Suitable nozzle apparatus is interposed between the high pressure vessel and the seltzer bottle, which must be mounted within a special casing compartment prior to charging. An elongated nozzle projects into the interior of the seltzer bottle for conducting gas into the bottle interior by first bubbling it through a previously established volume of water.

U.S. Pat. No. 3,953,550, issued Apr. 27, 1976, to Gilbey, also depicts a casing in which the high pressure carbon dioxide vessel is mounted within the casing adjacent to a compartment into which a bottle to be charged is inserted. Valve apparatus conducts high pressure carbon dioxide to an input nozzle assembly, which is physically mated with the bottle by a lower cam system which urges the bottle into sealing engagement with the filler for subsequent pressurization. In this device, as well as the previously discussed device, the bottle to be charged must be meticulously inserted and then withdrawn from the device casing. When withdrawn, the bottle is vented to atmosphere. The latter reference also teaches the use of a safety shield device separate from the carbonated beverage container, which is adapted to prevent inadvertent overcharging and over-pressurization.

U.S. Pat. No. 2,805,846, issued to Dewan on Sept. 10, 1957 discloses a portable beverage charging device essentially comprising a pair of generally tubular shells which are mated together about a bottle to be charged. When the shells are coupled together the bottle is in effect enshrouded within the shells, and the gas is inputted from a gas cylinder disposed in the reduced diameter neck of the upper shroud. When the shells are forcibly urged together gas flow occurs. After initial charging the enshrouded bottle may be vigorously shaken by the user, prior to removal by subsequent disassembly of the shroud elements. This carbonator device is also adapted to prevent over-pressurization and undesired, potentially harmful release of gas.

U.S. Pat. No. 4,294,410, issued to Gueret, on Oct. 13, 1981, discloses a closure device for a pressurized container. The reference is believed somewhat relevant to my discharge valve associated with the instant seltzer dispenser to be hereinafter described. Sealing caps or closures seen in the following U.S. Pat. Nos. are believed less relevant to my seltzer system: 4,295,583; 4,295,584; 4,294,370; 4,294,369; 4,294,367; and 4,294,368.

The most relevant prior art known to me comprises an unpatented home beverage carbonation system which I invented formerly, which was marketed by my former company, namely the Charlie O Partnership of Little Rock, Ark. The former Charlie O system is briefly described in a brochure entitled "The 6 Cent Soda in Six Easy Steps" published in 1981. The former device comprised a rather bulky commercial pressure vessel of carbon dioxide having an upper valve system adapted to be coupled to an elongated plastic hose. A special quick screw cap including a top mounted valve is adapted to be fitted to a desired plastic bottle for subsequent charging thereof. Once the bottle is filled to an appropriate level, and the pressure cap is sealably installed, the hose is snap-fitted between the charging vessel pressure regulator and the special cap. Thereafter, the bottle is vigorously shaken. After pressure equilibrium results, the charging hose would be removed, the bottle would be depressurized by manually depressing the fill valve, and the cap would be unscrewed, yielding a source of carbonated water to thereafter be dispensed at atmospheric pressure. When poured into a suitable container and mixed with a preselected quantity or syrup concentrate, soda results. The system envisioned a plurality of plastic syrup bottles, each of which was equipped with an upper pump actuated valve to readily output the syrup to the waiting container.

Unfortunately, the above described prior art devices are characterized by a number of commercially adverse aesthetic and utilitarian flaws.

From a consumer products safety standpoint the valve inter-coupling structure between the high pressure vessel and the seltzer bottle to be thereafter charged must be extremely reliable. Because of such safety considerations prior art devices of the enclosure or casing type tend to be rather bulky and heavy. Also, such devices require that the seltzer bottle be inserted and clamped within an adjacent casing, resulting in operator inconvenience to the operator.

All of the known prior art home dispensing systems including that disclosed in the referenced brochure, suffer in that once the carbonated water is charged, the cap of the seltzer container is removed. Such venting of course dissipates the former gas pressure head. This degradation of the $CO_2$ charge has been a recognized consumer objection to such systems. When the bottle or can top is removed for partial consumption of the contents, the carbonation level begins to dissipate rapidly, and the contents is degraded. When the cap is repeatedly removed and replaced, the problem is further aggravated. Even though the first helping of soda water mixed with syrup is appropriately carbonated, unconsumed water stored in the vessel will tend to slowly loose its charge to atmosphere, even if it is recapped between servings. In addition, when the output of such open seltzer bottles is directed into a glass, the low liquid pressure of the output stream does not facilitate vigorous syrup mixing. Therefore stirring is usually mandated, and that further dissipates the quality of the carbonated beverage produced.

A further problem with prior art "casing38 type systems is that the seltzer bottle is vigorously clamped or pushed into temporary abutment with the internally captivated valve system. This necessitates the use of a relatively rigid seltzer bottle usually comprised of glass. The shatter proof housing used for safety purposes results in a slow, inconvenient system. Even where a rigid compartmentalized housing is not employed, as shown in the system described in the aforementioned brochure, a somewhat disorganized combination of working elements results. For example, the carbonator vessel can be difficult and cumbersome to store, and when the device is used, particularly by children who desire more than one flavor, a sticky, syrupy mess can often result.

These and other disadvantages have been found to present prohibitive sales obstacle.

I have therefore proposed to eliminate the above referenced problems, and to provide a home beverage system which presents an orderly and aesthetically appeasing array of elements which function together to efficiently and safely provide a convenient system for producing carbonated beverages of a variety or flavors. And, it would seem highly desirable to provide a home system which is designed throughout to maintain high carbonation levels, while preserving a substantial margin of safety for the consumer.

SUMMARY OF THE INVENTION

The present invention comprises an integrated system, ideally adapted for use in the home, for producing carbonated water by charging an associated seltzer bottle and thereafter mixing a carbonated beverage of a desired flavor.

The system contemplates a conventional high pressure vessel filled with carbon dioxide gas. A unique integrated regulator and output valve assembly associated with the vessel is adapted to be coupled by an elongated fitting-equipped flexible cable to a unique seltzer bottle equipped with a multifunction discharge valve. The system also comprises a plurality of similar plastic squeeze bottles, each filled with a different flavor of syrup concentrate. A convenient rack, adapted to be disposed upon the kitchen counter, for example, stores the pressure vessel, the seltzer bottle, and individual syrup containers. In the best mode, the syrup containers are disposed in orderly rows upon the rack, and the pressure vessel and seltzer bottle are stored in convenient open air compartments. A pressure vessel box includes an offset top for conveniently storing the coiled fill tube. The seltzer bottle may be disposed within the rack immediately adjacent the pressure vessel for ease in manipulation and storage by the user.

Reduced pressure carbon dioxide gas is obtained from the high pressure vessel through an integrated multi-function regulator valve assembly. The valve assembly preferably comprises a rigid two-piece, generally tubular housing threadably coupled to the pressure vessel, which receives high pressure gas. A transverse passageway defined through the bottom housing portion in fluid-flow communication with an internal passageway establishes a high pressure fill orifice for recharging the vessel, and a safety vent for dissipating inadvertent high pressure. The top housing portion of the regulator valve assembly is threadably coupled to the bottom housing portion, and the two housing portions captivating an internal regulator piston whose larger diameter head is disposed in the top housing of the regulator, and whose reduced diameter stem is slidably fitted to a passageway in the bottom portion. A low pressure output valve secured at the top of the front housing enables low pressure gas to be transmitted out of the vessel via the resilient quick connect hose coupling.

In the best mode the seltzer dispenser comprises a translucent plastic bottle reinforced by a two-piece antifragmentation shroud. The discharge valve is threadably coupled to the reduced diameter neck of the bottle, and it includes a gas inlet orifice adapted to be coupled to the quick-connect hose for receiving low pressure gas from the regulator assembly. Inspection slots defined in the shroud enable the user to first fill the seltzer bottle to a desired level. Gas admitted into the discharge valve during charging is conducted internally or the bottle beneath the liquid level by an internal siphon tube and the vigorous bubbling which results is visible through the inspection slots. The preferred shroud, in combination with the bottle thicknesses, enables over-pressure to be quickly and non destructively vented in a safe direction in the unlikely event of a failure.

The discharge valve need not be removed from the container for subsequent dispensing of charged water. The internal gas pressure head is employed to dispense the liquid without removing the bottle cap. The discharge valve includes a manually operated lever adapted to trigger its internal valve elements for dispensing fluid out of the seltzer bottle through an adjacent output tube, which vigorously squirts charged water into the users glass or container. The seltzer bottle charging and seltzer dispensing functions are thus combined in the unique discharge valve. Pressurized seltzer will thus be vigorously outputted whenever the manual lever valve is depressed, in response to the pressure head from the internally confined gas upon the liquid surface therewithin.

A high carbonation level is also facilitated by properly configuring a diffuser assembly, preferably located at the bottom end of the siphon tube, and the orifice at the bottom end of the seltzer discharge valve. Orifice sizes are chosen to reduce the amount of scrubbing the liquid experiences during dispensing.

Preferably each of the syrup concentrate containers are of generally rectilinear proportions, and they are made of resilient plastic. A suitable cap including a manual spout element may be moved to an open position, and the bottle may thereafter be manually squeezed by the user to output syrup into a glass or container, prior to mixing with seltzer. Alternatively, a syrup pump may be employed for syrup discharge. When use of the seltzer dispenser and/or the concentrate bottles in terminated, all may be conveniently stored in the aesthetically pleasing rack, which itself may be deployed in a convenient, out-of-the-way position upon a kitchen counter or the like.

Thus a fundamental object of the present invention is to provide an integrated, user friendly carbonating and beverage dispensing system for home use.

A basic object of the present invention is to provide an integrated home soda system of the character described, which while being aesthetically pleasing, gives the user a broad range of beverages in a compact, convenient manner without storage or handling problems.

Yet another object of the present invention is to provide a fail-safe pressure regulating assembly for the high pressure gas vessel needed in such a system.

A similar object is to provide a system which neatly and conveniently stores the high pressure vessel, as well as the other elements of the system.

Yet another object of the present invention is to provide a home carbonated beverage production system of the character described, whose seltzer bottle need not be vented for subsequent seltzer discharge.

A still further object of the present invention is to provide a consumer-safe seltzer bottle suitable for use in home soda systems.

Yet another object of the present invention is to provide a reinforcement safety system for the seltzer bottle. It is a feature of the present invention that the unique two-piece shroud not only protects the seltzer bottle in the event of unlikely failure, but it is equipped with inspection slots which aid the user in properly charging and thereafter depleting the bottle.

A still further object of the present invention is to provide a convenient plurality of syrup concentrate bottles which may be quickly and easily used, and thereafter stored in a convenient, aesthetically pleasing manner.

A similar object is to provide a home carbonation system of the character described which vigorously carbonates water without significant user shaking of the seltzer bottle, depending on the carbonation level desired.

Another object of the present invention is to provide a storage rack for the above described elements of a home soda fountain system.

Another basic object of the present invention is to provide a seltzer bottle of the character described, which, virtually immediately after charging, is capable of vigorously dispensing carbonated seltzer into an awaiting container for consumption.

Another fundamental object of the present invention is to provide a home soda system of the character described which conveniently and inexpensively will produce a multiplicity of carbonated beverages.

Yet another object of the present invention is to provide a home soda system of the character described which may be safely and easily used by children.

Another important object is to provide a home soda system of the character described which can be easily used without creating the annoying messes characteristic of known prior art systems.

It is also an important object to provide a system of the character described which minimizes operational failures. Even if a failure does inadvertently occur, it is a feature of the present system that failures may be easily diagnosed and repaired by the user, practically without instruction.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary, front perspective view of the best mode of my HOME SODA DISPENSING SYSTEM with the components thereof arranged for temporary storage in an orderly fashion in the preferred rack system;

FIG. 2 is a fragmentary perspective view of the system similar to FIG. 1, but with the seltzer dispenser and certain syrup concentrate containers removed from the storage rack;

FIG. 3 is a perspective view of the empty rack;

FIG. 4 is an enlarged, top plan view of the empty rack of FIG. 3;

FIG. 6 is a fragmentary, exploded perspective view of the high pressure vessel and the regulator valve assembly;

FIG. 7 is a bottom perspective view of the regulator valve assembly bottom member;

FIG. 8 is a bottom perspective view of the opposite side of the regulator valve assembly bottom housing;

FIG. 9 is a top perspective view of the high pressure relief fitting;

FIG. 10 is a bottom perspective view of the high pressure relief fitting with portions thereof omitted for clarity;

FIG. 11 is a bottom perspective view of the high pressure fill valve;

FIG. 12 is a top perspective view of the high pressure fill valve;

FIG. 13 is a bottom perspective view of the regulator valve assembly top housing member;

FIG. 14 is a top perspective view of the opposite side of the regulator valve assembly top housing member;

FIG. 15 is an enlarged scale, fragmentary assembly view of the regulator valve assembly, showing how the top housing member of FIGS. 13 and 14 is operationally mated to the bottom housing member of FIGS. 7 and 8;

DETAILED DESCRIPTION

Figures 5, 5A:
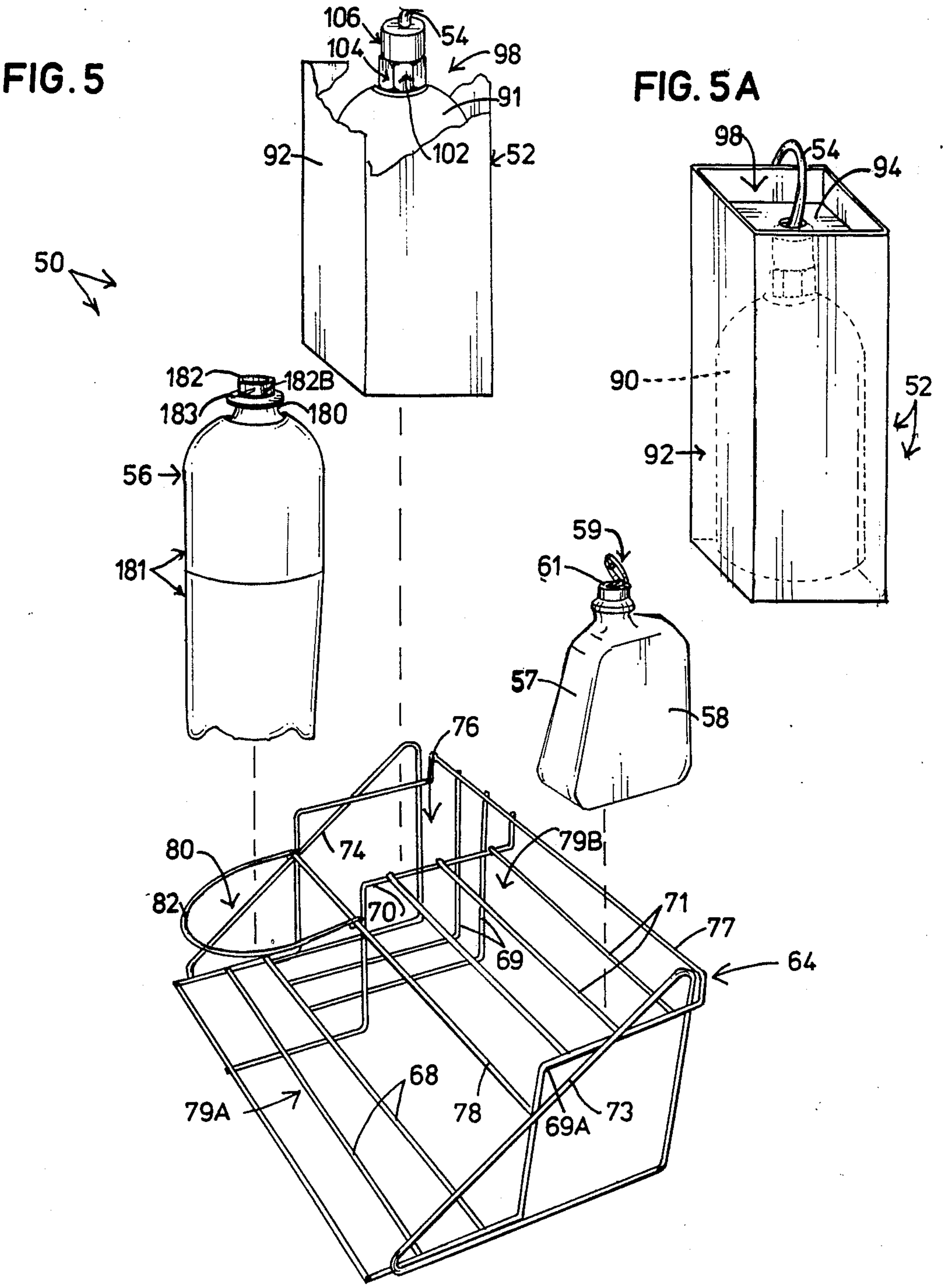
FIG. 5 is an enlarged, exploded, fragmentary, perspective view of the system, with certain portions thereof shown in section for clarity or omitted for brevity.
FIG. 5A is a perspective view of the carbon dioxide gas supply, with certain portions thereof shown in phantom lines for clarity, primarily illustrating the hose nesting compartment in the top of the preferred box housing.
Figure 16:
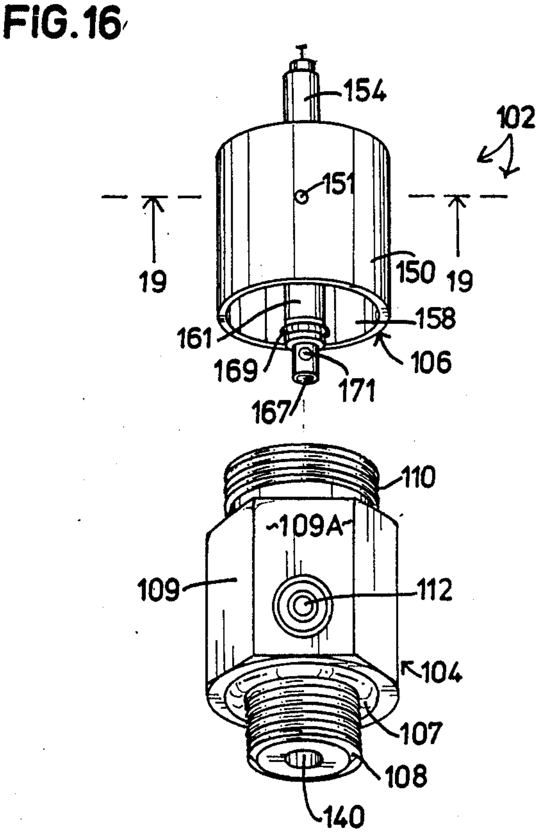
FIG. 16 is an enlarged and exploded fragmentary perspective view of the preferred regulator valve assembly showing how the bottom and top halves are mated together.
Figure 17:
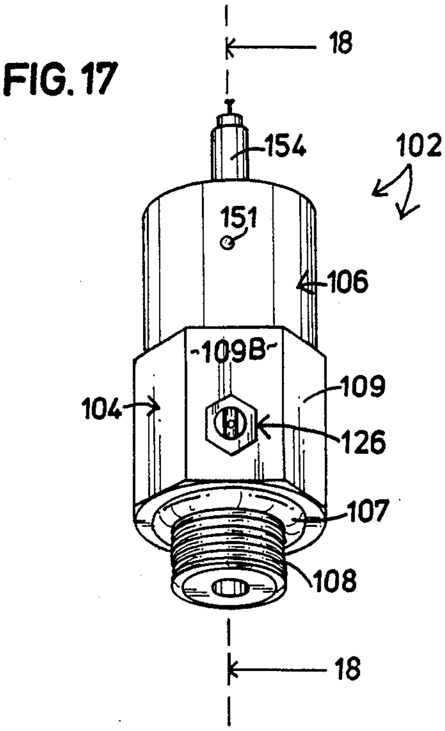
FIG. 17 is a top perspective view of the preferred regulator valve assembly.
Figure 19:
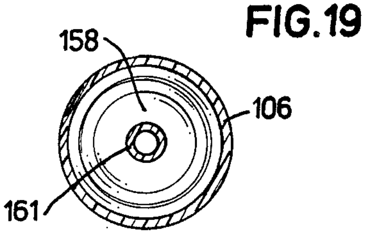
FIG. 19 is a vertical sectional view taken generally along line 19—19 of FIG. 16 in the direction of the arrows.

With initial reference now directed to FIGS. 1–5 of the appended drawings, a home soda dispensing system constructed in accordance with the best mode of the present invention has been generally designated by the reference numeral 50. System 50 preferably comprises a source of carbon dioxide 52 which charges a seltzer dispenser, broadly designated by the reference numeral 56. An elongated, resilient plastic hose 54 fitted with suitable conventional quick connect fittings 55 is adapted to couple the gas source 52 to the seltzer dispenser 56 for charging. As explained hereinafter, the dispenser should be filled with water, or the desired liquid mixture, prior to carbonation or charging. A plurality of smaller syrup bottles 58 filled with syrup concentrate provide numerous user selectable flavors. In the best mode the $CO_2$ source 52, the soda dispenser 56, and each of the syrup bottles 58 are conveniently stored in a rigid, supporting rack, generally designated by the reference numeral 64, which may be placed upon a counter top 66 or a similar convenient flat supporting surface.

Rack 64 is preferably comprised of numerous appropriately configured steel wire segments as illustrated. The bottom of the rack is comprised of a plurality of generally horizontally extending members 68 which are reinforced at their ends and which are united with generally L-shaped corner members 69. Upper horizontal rack elements 71 extend in a plane above the lower elements 68 between an intermediate corner member 70 and an outer corner frame member 69A. Reinforcement is achieved with the two inclined, wedge shaped side members 73 and 74.

A first compartment, generally designated by the reference numeral 76, is defined between top rear frame rail 77, reduced height frame rail 78, corner member 70 and side wedge member 74. Compartment 76 receives and temporarily stores the gas source 52. An adjacent compartment, generally designated by the reference numeral 80, is formed between rail 78 and an outwardly projecting, generally horizontally disposed loop member 82. The seltzer dispenser 56 may be captivated within the rack compartment 80 upon the bottom supportive surface provided by the horizontal rack members 68, being restrained by rack loop 82.

Upper and lower syrup bottle shelves 79B and 79A are disposed adjacent compartments 76 and 80 respectively.

Upper shelf 79B is generally defined by the upper horizontal rack elements 71. Similarly, lower shelf 79A is defined by the horizontal frame elements 68, to the right (as viewed in FIG. 3) of loop 82. As viewed in FIG. 2, the generally rectilinear syrup bottles 58 may thus be disposed in orderly rows at the bottom of the rack or at the top of the rack, adjacent the seltzer compartment 80 and the pressure vessel compartment 76. Once the loaded rack is appropriately disposed in a convenient place upon the counter-top 66, the entire system 50 will thus be conveniently stored in an aesthetically pleasing, orderly manner. In order to operate the device, and as will hereinafter be explained in detail, the seltzer dispenser 56 may be removed from the rack 64, and quick-coupled to the charging hose 54 for gas charging. Afterwards, a selected syrup bottle 58 may be removed from the rack, and syrup concentrate within the selected container may be directed into a suitable glass. Alternatively, syrup may be mixed with water within the discharge bottle prior to charging. Once the discharge valve associated with the seltzer bottle assembly is activated, a consumable carbonated beverage will be quickly "home made" for consumption.

Figure 27:
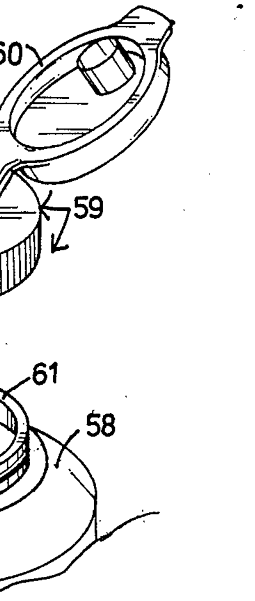
FIG. 27 is an enlarged, fragmentary, exploded perspective view of the syrup concentrate bottle cap.

With reference primarily directed to FIGS. 2, 5 and 27, the syrup bottles 58, which are blow molded from heavy duty polyethylene plastic, are generally rectilinear. Each syrup bottle comprises a flat bottom portion adapted to rest upon the shelves of the rack 64, and a flat, inclined forward surface 57 upon which suitable flavor-designating labels may be attached. An upper threaded neck 61 (FIG. 27) includes conventional threads to receive a conventional cap 59, which in the best mode comprises an SPE 33-400 standard plastic bottle cap. A syrup bottle 58 may thus be opened by manually opening the pop-up cover portion 60 (FIG. 27) exposing output orifice 65, and thereafter syrup concentrate may be outputted merely by squeezing the bottle. Alternatively a dispensing pump (not shown) may be threadably coupled to the syrup bottle instead of the cap 59.

With particular attention now directed to FIGS. 1, 2, 5, 5A and 6, the gas source 52 preferably comprises a conventional, high pressure gas vessel 90 which is attractively packaged within a generally cubical, box-like housing 92. Housing 92 is configured to readily fit within the generally cubical confines of rack compartment 76 previously described, and it includes a recessed top 94 which substantially covers gas vessel 90. Hose 54 passes through top 94. As best viewed in FIG. 5A, the recessed top 94 defines a storage compartment 98 for housing the coiled charging hose 54 between chargings. The reduced diameter surface region 91 of the pressure vessel 90 terminates in a high pressure orifice 100 (FIG. 6) which threadably receives a regulator valve assembly, generally designated by the reference numeral 102, which outputs low pressure gas for charging the seltzer dispenser 56.

With primary attention now directed to FIGS. 7 through 20, the regulator assembly 102 comprises a bottom housing 104 which is threadably coupled to the gas vessel output orifice 100, and a cooperating top housing 106 mated to the bottom housing 104. The bottom housing 104 comprises a threaded lower end 108 adapted to be threadably coupled to vessel orifice 100, and a spaced-apart larger diameter upper threaded portion 110 adapted to be threadably mated to the top housing member 106. A sealing 0-ring 107 is associated with threaded end 108. A nut-like, multi-faceted intermediate body portion 109 is integral with lower and upper threaded portions 108 and 110.

Body portion 109 of regulator valve assembly bottom housing 104 comprises a facet 109A (FIG. 7) provided with a suitable threaded orifice 112 for mounting a high pressure fill valve 114 (FIG. 6, 11–12). With reference to FIGS. 11 and 12, the high pressure fill valve 114 is of conventional construction, comprising a larger diameter portion 116 adapted to be threadably fitted within orifice 112, an integral lower diameter portion 118 adapted to be coupled to a high pressure gas source, an intermediate nut portion 117 which aids in assembly, and an internal, spring biased filling valve member 119 of conventional construction (FIG. 12). Vessel 90 may thus be charged from a high pressure commercial source of carbon dioxide gas by coupling to fitting 114.

On the opposite side, an equivalent facet 109B (FIG. 8) includes a similar threaded orifice 122 for receiving a high pressure relief valve assembly 124 (FIGS. 9, 10). Assembly 124 comprises a fitting 126 having a nut-like cap 128 and an integral threaded shank 130 threadably fitted to orifice 122. The relief valve assembly 124 also comprises a resilient circular rupturedisk seal 132 which generally occludes the longitudinal passageway 134 defined in shank 130, by compression against a dead soft copper washer 131. Seal 132 is characterized by a burst pressure of 2800–3000 PSI. It will be noted that cap 128 includes a transverse passageway 136 which is in fluid-flow communication with passageway 134. In the event that over-pressurization occurs within the high pressure vessel 90, pressure relief is provided through orifice 122 (FIG. 8), past relief seal 132, and out transverse passageway 136 in a harmless direction tangential to the vessel sides.

Figure 18:
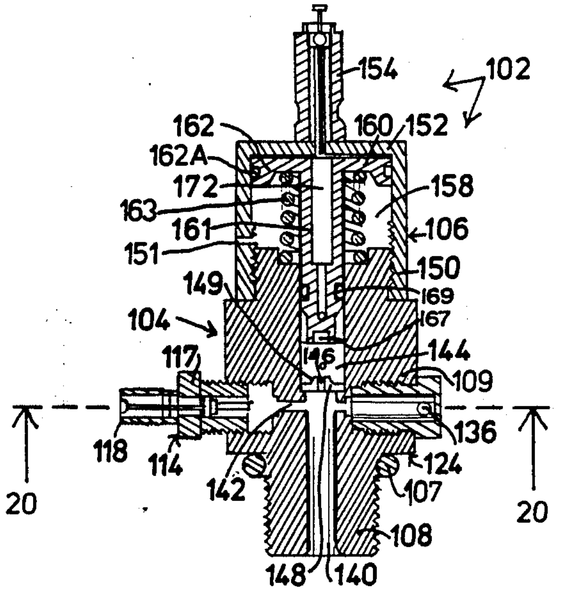
FIG. 18 is a longitudinal sectional view taken generally along line 18—18 of FIG. 17.
Figure 20:
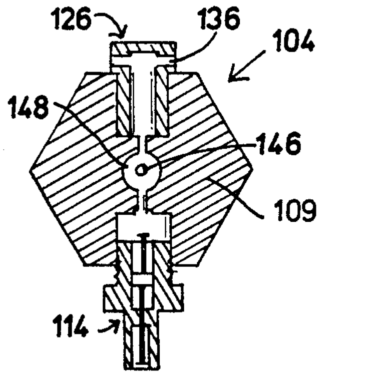
FIG. 20 is a vertical sectional view taken generally along line 20—20 of FIG. 18 in the direction of the arrows.

With additional reference directed now to FIG. 18, the bottom housing 104 comprises a lower passageway 140 concentrically extending through threaded bottom 108 which is disposed in fluid-flow communication with a transverse passageway 142 and an upper passageway 144. Passageway 142 interconnects orifices 112 and 122 (FIGS. 7, 8) into which the fill valve 114 and the relief valve 124 are fitted. Upper passageway 144 concentrically extends through the nut body portion 109 and adjacent upper threaded portion 110. Passageways 140 and 144 are separated from one another by a restriction orifice 146. As best viewed by comparing FIGS. 18 and 20, the restriction orifice 146 is concentrically formed in the middle of a restriction !48 having a slight crown 149 whose purpose will be hereinafter described. Nevertheless at this point it will be apparent that the interior of the vessel 90 may be charged by applying high pressure gas to fitting 114 and thus orifice 142 and passageway 140. And high pressure venting may occur through the relief valve 124, since it is in fluid flow communication with the vessel interior through passageways 140 and 142 as well.

As previously mentioned the regulator valve assembly also comprises a top housing 106 (FIGS. 13–18). It comprises a tubular body portion 150 which is internally threaded to mate with the threaded top 110 of the bottom regulator housing previously discussed, and it houses an axially displaceable plunger assembly 160 comprising a piston 162 and a stem 161. Piston 162 includes a conventional large 0-ring 162A. The top 152 (FIG. 18) integrally includes a low pressure discharge valve 154 which is in fluid flow communication with that portion of the interior 158 which is immediately above the internal piston 162. The interior cavity 158 is vented to atmosphere by orifice 151 (FIGS. 16, 17) below piston 162. The piston stem 161 terminates in a lower, preferably plastic (i.e. Teflon-brand) seal 167 which, as viewed in FIG. 18, normally contacts crown 149 to block restriction orifice 146. The piston stem 161 is slidably fitted within passageway 144, and it is sealed by an 0-ring 169. A spring 163 (FIGS. 15 and 18) disposed within cavity 158 biases the plunger 160 towards the low pressure gas output valve 154.

High pressure gas escaping through the restriction orifice 146 when the piston is deflected upwardly against the working surface provided by seal 167 is confined beneath 0-ring 169, but may enter the transverse orifice 171 for conduction via longitudinal slot 172 (FIG. 18) to a relief position immediately above piston 162 below top 152. A balancing of force between the pressure above the regulator piston 162 and the high pressure transmitted to the teflon seal 167 will thus result in pressure regulation. Low pressure gas may be outputted through the valve 154, which as explained previously, may be snap-fitted to the charging hose 54 for conduction to the seltzer dispenser 56.

Figure 28:
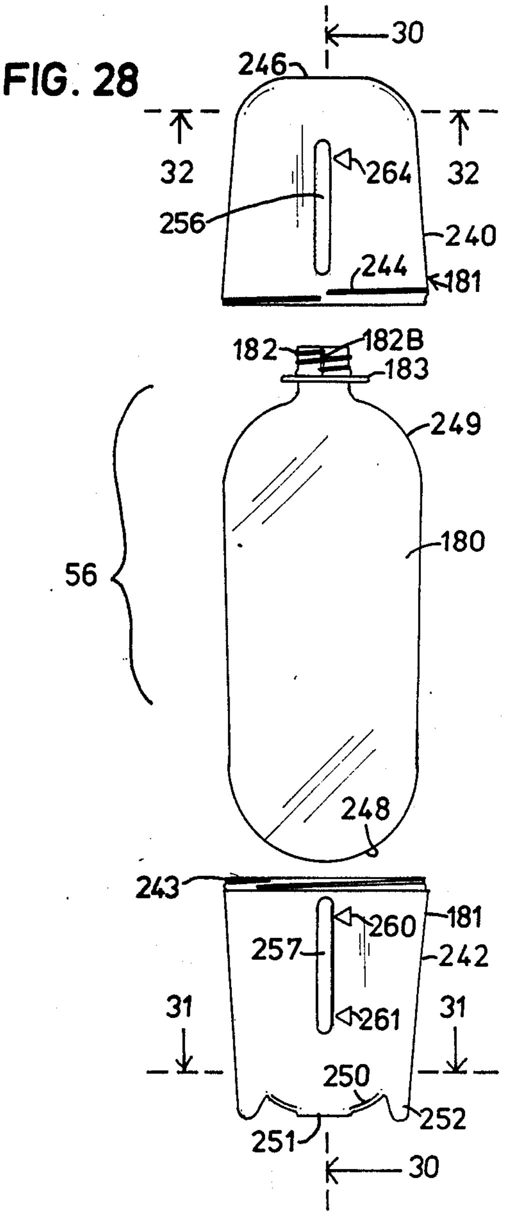
FIG. 28 is an exploded, fragmentary elevational view or the preferred seltzer bottle and its associated non-fragmenting housing.
Figure 30:
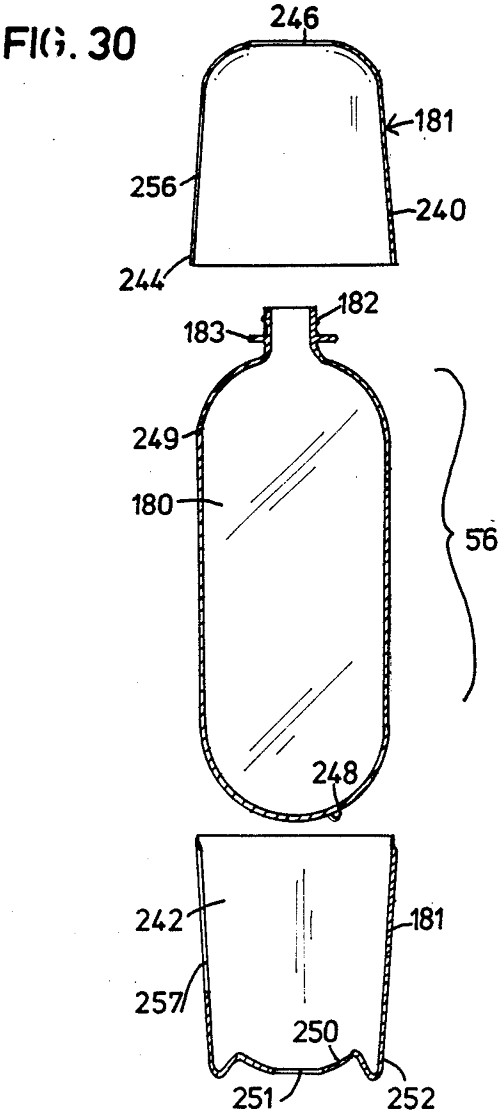
FIG. 30 is a longitudinal sectional view taken generally along line 30—30 of FIG. 28.

Turning now to FIGS. 5, 21 through 26, and 28–31, the seltzer dispenser comprises a translucent, blow-molded plastic bottle 180 having a threaded neck 182 which may be threadably coupled to a seltzer discharge valve assembly, generally designated by the reference numeral 184 (i.e. FIGS. 21–26). Seltzer bottle 180 is preferably housed within a two piece non-fragmenting housing generally designated by the reference numeral 181 (FIG. 5) to be described in detail hereafter. As seen in FIGS. 5 and 28 the bottle 180 includes a peripheral flange 183 separating the threaded neck 182 from the lower body portion. Conventional safety vent slots 182B are defined in the bottle's threads to vent the bottle as the discharge valve is unscrewed to prevent "popping."

With reference to FIGS. 21 through 26, the seltzer valve assembly comprises a rigid generally plastic and tubular body 188 comprising a base, generally designated by the reference numeral 190 and an integral, reduced diameter upper tubular portion 192. Base 190 circumscribes a large mouth 191 including threads 191B adapted to be threadably coupled to the threaded bottle end 182 (FIG. 5). Mouth 191 is thus defined by a peripheral annular base 197 which, when the discharge assembly 184 is forcibly threaded to the bottle 180, closely approaches the bottle flange 183 previously described. Body 188 also includes a downwardly directed tubular inlet 194 including a low pressure gas inlet orifice 195 which conducts low pressure gases interiorly of the bottle via a filling check valve 196 coupled to the hose 54 previously discussed. Additionally, an integral, downwardly inclined and tubular spout 198 includes an output passageway 199 in fluid flow communication with the upper volume 200 (FIG. 26) in which a lever valve assembly, generally designated by the reference numeral 202 (FIG. 26), is disposed.

Figure 21:
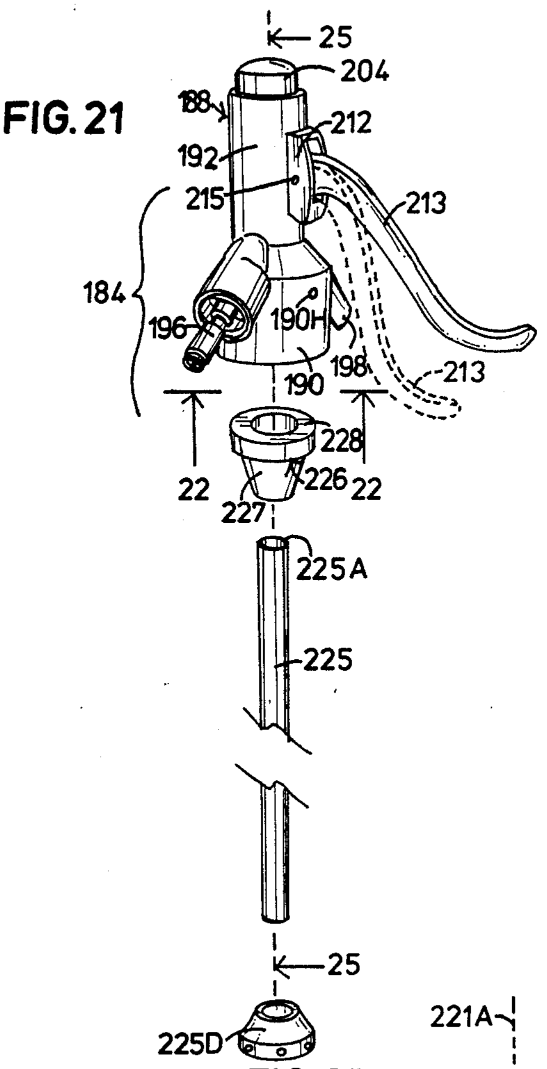
FIG. 21 is an enlarged, fragmentary, exploded perspective view of the preferred seltzer discharge valve assembly.
Figure 25:
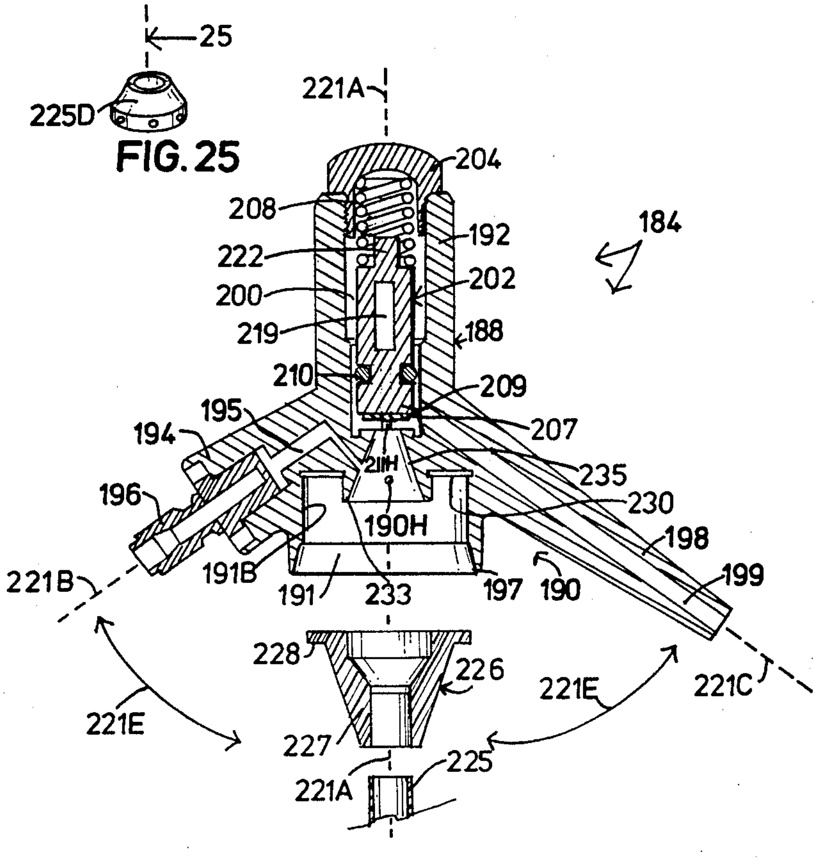
FIG. 25 is an enlarged, fragmentary, longitudinal sectional view taken generally along line 25—25 of FIG. 21, in the direction of the arrows.
Figure 26:
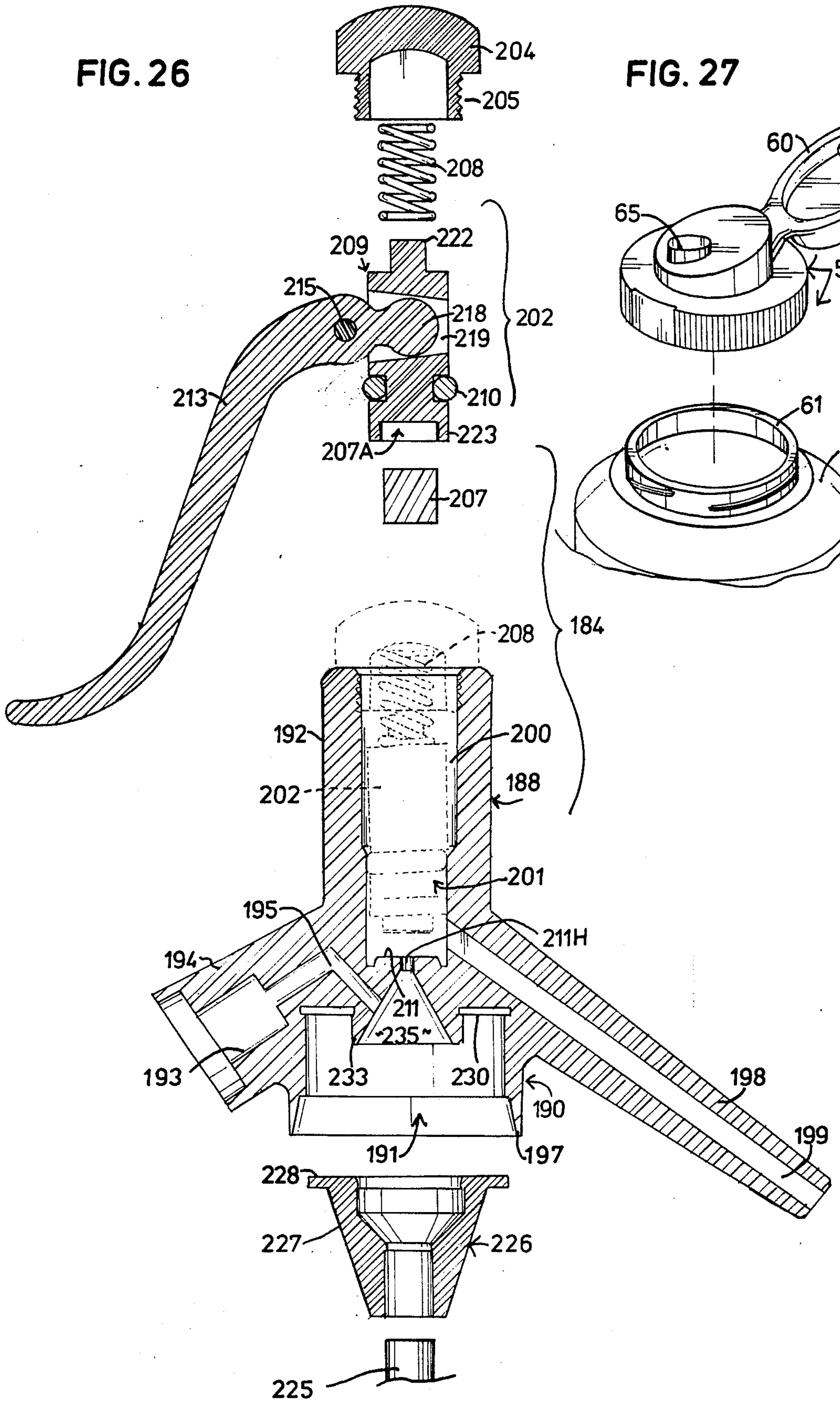
FIG. 26 is an enlarged, exploded, fragmentary, assembly view of the seltzer bottle discharge valve apparatus, with portions thereof broken away or shown in section for clarity.

With reference to FIGS. 21, 25, and 26, a vent orifice 190H vents the generally conical interior region 235 to atmosphere. A liquid seal is nevertheless maintained when the device is assembled because of flange 228 on gasket 226 to be described later. When a pressure head is present in the bottle, and the user nevertheless unscrews the discharge valve, the gasket is loosened and gas pressure id dissipated though orifice 190H while the screw threads are still at least partially meshed. This safety feature prevents "Champagne-cork" popping phenomena. In addition, further pressure relief is facilitated during unscrewing by vent slots 182B defined in the bottle closure threads. The pressure seal otherwise maintained by the seated or meshed screw threads coupling the discharge valve to the bottle is relieved by slots 182B, which then intercommunicate the bottle interior with the gradually withdrawing mouth 191 without interference from gasket 226.

As best viewed in FIGS. 25–26, the lever valve assembly 202 is restrained via a cap 204 including a reduced diameter threaded portion 205 adapted to be coupled to upper body portion 192. A spring 208 biases a cam housing 209 having an O-ring 210 into region 201 (FIG. 26). When cap 204 is tightened, an actuator seal 207, which is force fitted into recess 207A, abuts valve seat 211 to block communicator orifice 211H. Orifice 211H establishes fluid flow communication between regions 201 and 235.

Figure 22:
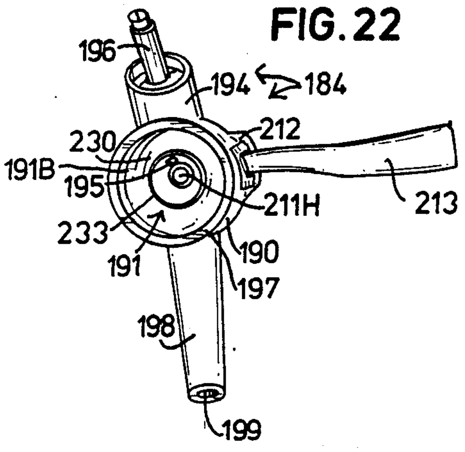
FIG. 22 is a bottom perspective view of the seltzer discharge valve, taken generally along line 22—22 of FIG. 21 in the direction of the arrows.
Figure 23:
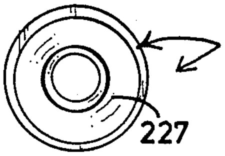
FIG. 23 is an enlarged bottom plan view of the flange conical gasket.
Figure 24:
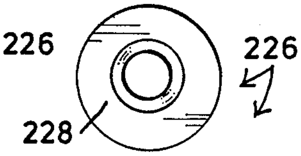
FIG. 24 is an enlarged top plan view of the gasket or FIG. 23.

As seen in FIGS. 21 and 22, a box-like housing 212 is integrally associated with valve upper portion 192. A generally arcuate lever 213 is pivotally mounted within box 212 via a pin 215. Lever 213 includes an inwardly projected terminus 218 fitted to the interior 219 of cam housing 209. The cam housing 209 includes an upper stem 222 which penetrates and restrains spring 208, and a bottom 223 fitted with an O-ring 210 which slides within region 201. Recess 207A defined in bottom 223 (FIG. 26) mounts seal 207. The seal 207, spring 208, cam housing 209, cap 204 and the siphon tube 225 (and other working parts and passageways) are aligned with the longitudinal axis 221A (FIGS. 25, 26) of the discharge valve assembly. Inlet 194 has a longitudinal axis 221B, and spout 198 has a longitudinal axis 221C which is coplanar with axis 221B. Axis 221B and 221C both intersect longitudinal axis 221A forming an angle 221E which is between fifty and sixty degrees. IN the best mode it is approximately fifty five degrees. I have found that this design facilitates compactness of the seltzer discharge valve assembly, and provides an optimum angle for dispensing liquid from the spout. A similar angle for the inlet valve preserves symmetry.

It will be apparent from FIGS. 26 and 21, that, as lever 213 is moved downwardly, terminus 218 will rock cam housing 209 upwardly against yieldable pressure from spring 208, the upper portion of which will contact the interior of cap 204. In so doing, communication orifice 211H will be unblocked, and the pressure within mouth 191 and conical region 235 will escape into regions 200, 201 for venting out spout 198 through its passageway 199. The high pressure gas head existing at the top of the charged bottle will force carbonated water through the downwardly projecting siphon tube 225 up into the interior of the valve assembly for transmission out spout 198. Siphon tube 225, which extends downwardly into the bottle beneath the liquid level, is mounted by a gasket 226, and it preferably terminates in a terminal diffuser 225D (FIGS. 21,, 33, and 34).

The diffuser 225D comprises an apertured disc 225E integral with a central sleeve 224F adapted to be friction fitted to siphon tube 225. In operation , the diffuser will be disposed beneath the water level within the seltzer bottle. The radially spaced apart orifices 225G defined in disc 225E communicate via passageway 224B with the interior of the siphon tube 225. This construction reduces the conduction speed of liquid into the siphon tube during liquid discharge, and it reduces gas admission speed during charging. Further, charging gas is distributed throughout the bottle evenly to increase scrubbing and minimize the need for shaking during the carbonation process. The combined orifice area of the diffuser holes 225G preferably approximates the area size of orifice 211H.

With particular attention now directed to FIGS. 23 through 26, siphon tube 225 which projects form conical region 235 through mouth 191 out of the valve body 188 into the interior of the bottle is preferably coupled with a generally conical, resilient gasket generally designated by the reference numeral 226. Gasket 226 comprises a tubular, tapered portion 227 into which the siphon tube 225 is fitted and an increased diameter flange portion 228 which seals the dispenser base 190 to the bottle 180. Mouth 191 of the valve 188 includes an annular recess 230 adapted to receive gasket 226, and a concentrically disposed inner collar 233 enshrouded by the gasket 226 when it is installed. In this fashion the siphon tube will be wedged into region 235 (FIGS. 25, 26) immediately adjacent the valve sub assembly 202. Through the construction disclosed, it will be apparent that the gas input orifice 195 will be constrained to deliver its pressure interiorly of the siphon tube during the charging cycle, since access to atmosphere through orifice 211H and spout 198 is foreclosed unless lever 213 is depressed. In other words, through the gasket construction disclosed inputting charging gases are forced through the siphon tube downwardly into the bottled water during charging, and they rapidly bubble through the water to form a high pressure head at the top of the filled bottle. The pressure thereafter serves as the energy mechanism for dispensing liquid.

Figure 29:
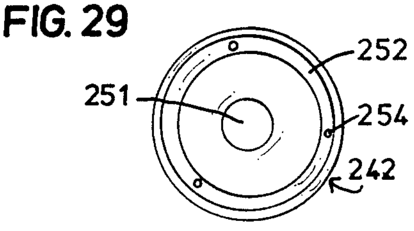
FIG. 29 is a bottom plan view of the lower half portion or the non-fragmenting housing.
Figure 31:
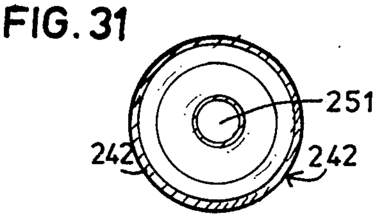
FIG. 31 is a vertical sectional view taken generally along line 31—31 of FIG. 28.
Figure 32:
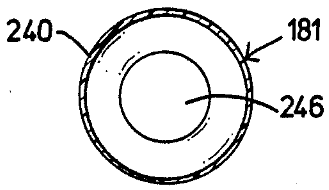
FIG. 32 is a vertical sectional view taken generally along line 32—32 of FIG. 28 in the direction of the arrows.
Figure 33:
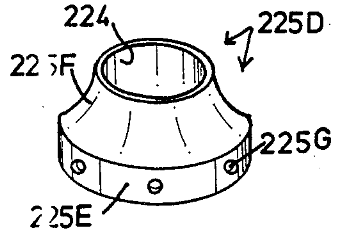
FIG. 33 is an enlarged front perspective view of the preferred siphon tube diffuser, the rear being a mirror image thereof; and, FIG. 34 is an enlarged front elevational view of the preferred siphon tube diffuser.
Figure 34:
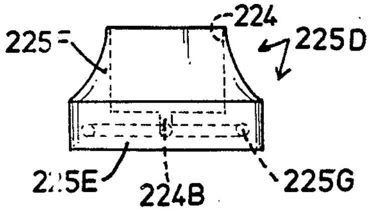

With attention directed now to FIGS. 28 through 32, the seltzer dispenser 56 stores water within a blow molded preferably translucent plastic bottle 180. THe non-fragmenting housing 181 comprises an upper generally cup-like half 240 adapted to be threadably coupled to cooperating, generally cup-like lower half 242. Suitable threads 244 are simply mated to threads 243 in lower half 242. The neck of the bottle will project upwardly through an orifice 246 defined in the top of half 240. The generally convex bottom 248 of bottle 180 will be gently urged into contact with a generally concave interior bottom 250 of non-fragmenting housing half 242. THe concave bottom 250 is surrounded by an annulus 252 having a bottom in which preferably three, radially spaced-apart, moisture venting holes 254 are defined (FIG. 29). Bottom 250 also comprises a central pressure relief orifice 251. The bottle bottom 248 is preferably blow molded a thinner gauge than the top 249 or the bottle sides.

Through the bottle construction disclosed, failure of the bottle will result in destruction of bottle 248 since bottom 248 is thinner. Escaping gases from bottle failure will thus be safely vented through orifice 251 and relief orifices 254. In addition, failure of the bottle walls or sides will result in venting through orifices 254, and through a pair of inspection slots 256 and 257.

Inspection slots 256 and 257 enable the user of the device to view the interior o the bottle. The lower inspection slot 257 is associated with a pair of marker tabs 260 and 261 respectively disposed adjacent the slot's top and bottom. A similar marker tab 264 is defined adjacent the top of upper inspection slot 256. The bottom marker tab 261 indicates the level to which syrup concentrate should be added if it is desired to batch produce a single flavor. In this case, water is then added to "level full" marker tab 264. Level marker 260 is in the middle; it is ideal for producing a wine cooler drink or other special formula drinks. In the latter case, wine, for example, may be filled to the level indicated by marker tab 261, and then water is added to level 260 prior to gas charging. If it is desired merely to produce club soda, by way of example, water is filled to full level marker 264 prior to bottle charging. Soda may then be consumed "straight," or it may be blended with a selected syrup within a suitable glass to exteriorly produce a soda drink of a desired flavor.

It will thus be apparent that the system disclosed herein, taken as a whole, comprises a "hands-on" soda system which functions without normally hidden parts disposed beneath cabinet level. Special cabinetry or special fixtures will not be required for successful use of the invention. Moreover, it will be apparent that the system may be used in many ways to produce drinks satisfying a variety of different user tastes or requirements.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A soda fountain system comprising:

a source of high pressure carbon dioxide gas comprising a pressure vessel and a regulator valve assembly associated with said vessel for selectively discharging low pressure carbon dioxide gas;

a seltzer dispenser adapted to be partially filled by a user with water and thereafter pressurized with low pressure carbon dioxide gas by interconnection with said regulator assembly, said seltzer dispenser comprising a seltzer bottle for containing gas and liquid and a seltzer discharge valve for selectively outputting seltzer from said bottle, said discharge valve adapted to be threadably coupled to said bottle and comprising:

low pressure gas inlet valve for pressurizing said bottle;

a low pressure output spout for discharging seltzer from the bottle;

a normally blocked communication orifice selectively permitting fluid flow communication between said bottle and said output spout; and, lever valve means normally blocking said communication orifice for actuating said bottle;

hose means adapted to be selectively coupled between said regulator valve assembly and said low pressure inlet valve to pressurize said bottle;

a plurality of syrup containers, each containing a different flavor of syrup concentrate, for providing a source of syrup to be mixed with seltzer; and, rack means adapted to be disposed upon a supporting surface and comprising a pair of compartments for conveniently receiving and storing said source and said seltzer dispenser, and at least one adjacent shelf for conveniently storing one or more of said syrup containers.

2. The system as defined in claim 1 including a box for containing and housing said pressure vessel, said box having a recessed top defining a nest area for storing said hose means during non use.

3. The system as defined in claim 1 wherein said regulator valve assembly comprises:

a rigid, generally tubular bottom housing adapted to be threadably coupled to said pressure vessel, said bottom housing internally comprising lower and upper passageways separated from one another by a restriction orifice which permits fluid communication between said upper and lower passageways, said bottom housing comprising pressure relief means for venting said vessel in response to a predetermined overpressure and a high pressure filling valve for safely recharging said pressure vessel;

a rigid, generally tubular top housing adapted to be threadably coupled to said bottom housing, said top housing comprising a low pressure gas output valve;

internal plunger means for selectively unblocking said restriction orifice, said plunger means comprising piston means operationally slidably disposed in said top housing and stem means slidably received within said upper passageway of said bottom housing; and, internal spring means for normally biasing said piston means toward said low pressure gas output valve.

4. The system as defined in claim 3 wherein said regulator assembly pressure relief means and said high pressure filling valve are fitted into transverse passageways machined into said bottom housing in axial alignment with one another, said transverse passageways disposed in fluid flow communication with said lower passageway defined within said bottom housing.

5. The system as defined within claim 4 wherein said stem means terminates in a reduced diameter portion adapted to contact said restriction orifice, and comprises a passageway for admitting gas from said upper passageway of said bottom housing and venting it above said piston means into fluid flow communication with said low pressure output valve.

6. The system as defined in claim 5 wherein that portion of the interior of said top housing beneath said piston means is vented to atmosphere.

7. The system as defined in claim 5 including a box for containing and housing said pressure vessel, said box having a recessed top defining a nest area for storing said hose means during non use.

8. The system as defined in claim 5 wherein said seltzer dispenser comprises non-fragmenting housing means for shrouding said bottle, said housing means comprising upper and lower halves adapted to be coaxially fitted upon said bottle.

9. The system as defined in claim wherein said seltzer dispenser comprises non-fragmenting housing means for shrouding said bottle, said housing means comprising upper and lower halves adapted to be coaxially fitted upon said bottle.

10. The system as defined in claim 9 wherein said bottle is translucent, and each of said housing means halves comprises elongated inspection slots adapted to expose the interior of said bottle to permit visual inspection thereof.

11. The system as defined in claim 10 wherein said housing means comprises marker tab means adjacent said inspection slots for establishing proper liquid levels within said bottle prior to gas charging thereof.

12. The system as defined in claim 9 wherein said lower housing half comprises a plurality of lower vent holes for relieving pressure in the event of a burst.

13. The system as defined in claim 12 including a box for containing and housing said pressure vessel, said box having a recessed top defining a nest area for storing said hose means during non use.

14. The system as defined in claim 1 wherein said seltzer discharge valve comprises an integral base adapted to be threadably coupled to said bottle, an inlet mouth circumscribed by said base, an internally defined reduced diameter collar spaced apart from said mouth and circumscribing said communication orifice, a conical region in fluid flow communication with said communication orifice and surrounded by said collar, a siphon tube extending from said conical region into the interior of said bottle, an annulus defined between said collar and said base, and a gasket adapted to be coupled to said collar for mounting said siphon tube.

15. The system as defined in claim 14 wherein said gasket comprises a flange portion adapted to be received within said annulus for sealing said discharge valve to said bottle.

16. The system as defined in claim 15 wherein said low pressure inlet valve is in fluid flow communication with said siphon tube.

17. The system as defined in claim 16 wherein said low pressure inlet valve has an axis, and said spout has an axis coplanar with said first mentioned axis.

18. The system as defined in claim 17 wherein said lever valve means comprises a lever disposed above said inlet valve and said spout, means for pivotally mounting said lever, and cam housing means actuated by said lever for selectively blocking and unblocking said communication orifice.

19. The system as defined in claim 18 wherein said discharge valve lever occupies a plane substantially transverse and perpendicular with respect to the plane occupied by the axis of said inlet valve and the axis of said discharge nozzle.

20. The system as defined in claim 1 wherein each of said syrup containers comprises a resilient plastic bottle adapted to b squeezed by the user to output syrup, and an upper valve defined at the top of said bottle for suitably directing syrup into said bottle when said syrup container(s) is squeezed.

21. The system as defined in claim 20 wherein said rack means comprises shelf means for containing a plurality of said syrup containers in at least one orderly row, an enclosure for semipermanently storing said source of high pressure gas, and a user accessible compartment for semi-permanently storing said seltzer dispenser adjacent said source of high pressure gas.

22. The system as defined in claim 21 wherein said system comprises a box for containing said pressure vessel which provides a nest area for said hose means during storage.

23. The system as defined in claim 22 wherein said seltzer dispenser comprises non-fragmenting housing means for shrouding said bottle, said housing means comprising upper and lower halves adapted to be coaxially fitted upon said bottle.

24. The system as defined in claim 23 wherein said bottle is translucent, and each of said housing means halves comprises elongated inspection slots adapted to expose the interior of said bottle to permit visual inspection thereof.

25. The system as defined in claim 24 wherein said housing means comprises marker tab means adjacent said inspection slots for establishing proper liquid levels within said bottle prior to gas charging thereof.

26. The system as defined in claim 25 wherein said lower housing half comprises a plurality of lower vent holes for relieving pressure in the event of a burst.

27. The system as defined in claim 26 including a decorative box for housing said pressure vessel, said box comprising a nest area for temporarily storing said hose means.

28. A soda fountain system comprising:

a source of high pressure carbon dioxide gas comprising a pressure vessel and a regulator valve assembly associated with said vessel for selectively discharging low pressure carbon dioxide gas, said regulator valve assembly comprising pressure relief means for venting said vessel in response to a predetermined overpressure, a high pressure filling valve for safely recharging said pressure vessel, and a low pressure gas output valve;

a seltzer dispenser adapted to be partially filled by a user with water, and thereafter pressurized with low pressure carbon dioxide gas by interconnection with said low pressure gas output valve, said seltzer dispenser comprising a seltzer bottle for containing gas and liquid and a seltzer discharge valve for selectively outputting seltzer from said bottle, said discharge valve adapted to be threadably coupled to said bottle and comprising:

a low pressure gas inlet valve for pressurizing said bottle;

a low pressure output spout for discharging seltzer from the bottle interior;

a normally blocked communication orifice selectively permitting fluid flow communication between said bottle interior and said output spout; and, lever valve means normally blocking said communication orifice for actuating said bottle;

hose means adapted to be selectively coupled between said low pressure output valve and said low pressure inlet valve to pressurize said bottle;

a plurality of syrup containers, each containing a different flavor of syrup concentrate, for providing a source of syrup to be mixed with seltzer; and, rack means adapted to be disposed upon a supporting surface and comprising a pair of compartments for conveniently receiving and storing said source and said seltzer dispenser, and at least one adjacent shelf for conveniently storing one or more of said syrup containers.

29. The system as defined in claim 28 including a decorative box for housing said pressure vessel, said box comprising a nest area for temporarily storing said hose means.

30. The system as defined in claim 28 wherein said regulator valve assembly comprises:

a rigid, generally tubular bottom housing adapted to be threadably coupled to said pressure vessel, said bottom housing internally comprising lower and upper passageways separated from one another by a restriction orifice which permits fluid communication between said upper and lower passageways, a rigid, generally tubular top housing adapted to be threadably coupled to said bottom housing, said top housing comprising a low pressure gas output valve;

internal plunger means for selectively unblocking said restriction orifice, said plunger means comprising piston means operationally slidably disposed in said top housing and stem means slidably received within said upper passageway of said bottom housing; and, internal spring means for normally biasing said piston means toward; said low pressure gas output valve.

31. The system as defined in claim 30 wherein said regulator assembly pressure relief means and said high pressure filling valve are fitted into transverse passageways machined into said bottom housing in axial alignment with one another, said transverse passageways disposed in fluid flow communication with said lower passageway defined within said bottom housing.

32. The system as defined within claim 31 wherein said stem means terminates in a reduced diameter portion adapted to contact said restriction orifice, and comprises a passageway for admitting gas from said upper passageway of said bottom housing and venting it above said piston means into fluid flow communication with said low pressure output valve.

33. The system as defined in claim 32 wherein that portion of the interior of said top housing beneath said piston means is vented to atmosphere.

34. The system as defined in claim 28 wherein said seltzer discharge valve comprises an integral base adapted to be threadably coupled to said bottle, an inlet mouth circumscribed by said base, an internally defined reduced diameter collar spaced apart from said mouth and circumscribing said communication orifice, a conical region in fluid flow communication with said communication orifice and surrounded by said collar, a siphon tube extending from said conical region into the interior of said bottle, an annulus defined between said collar and said base, and a gasket adapted to be coupled to said collar for mounting said siphon tube.

35. The system as defined in claim 34 wherein said gasket comprises a flange portion adapted to be received within said annulus for sealing said discharge valve to said bottle.

36. The system as defined in claim 35 wherein said low pressure inlet valve is in fluid flow communication with said siphon tube.

37. The system as defined in claim 36 wherein said low pressure inlet valve has an axis, and said spout has an axis coplanar with said first mentioned axis.

38. The system as defined in claim 37 wherein said seltzer discharge valve has a longitudinal axis, and said low pressure inlet valve axis and said spout axis each intersect said longitudinal axis at an angle of between 50 and 60 degrees.

39. The system as defined in claim 38 wherein said lever valve means comprises a lever disposed above said inlet valve and said spout, means for pivotally mounting said lever, and cam housing means actuated by said lever for selectively blocking and unblocking said communication orifice.

40. The system as defined in claim 39 wherein said discharge valve lever occupies a plane substantially transverse and perpendicular with respect to the plane occupied by the axis of said inlet valve and the axis of said discharge nozzle.

41. The system as defined in claim 28 wherein each of said syrup containers comprises a resilient plastic bottle adapted to be squeezed by the user to output syrup, and an upper valve defined at the top of said bottle for suitably directing syrup into said bottle when said syrup container(s) is squeezed.

42. The system as defined in claim 41 wherein said rack means comprises shelf means for containing a plurality of said syrup containers in at least one orderly row, an enclosure for semi-permanently storing said source of high pressure gas, and a user accessible compartment for semi-permanently storing said seltzer dispenser adjacent said source of high pressure gas.

43. The system as defined in claim 42 wherein said system comprises a box for containing said pressure vessel which provides a nest area for said hose means during storage.

44. A home soda fountain system comprising:

a source of high pressure carbon dioxide gas comprising a pressure vessel and a regulator valve assembly associated with said vessel for selectively discharging low pressure carbon dioxide gas, said regulator valve assembly comprising pressure relief means for venting said vessel in response to a predetermined overpressure, a high pressure filling valve for safely recharging said pressure vessel, and a low pressure ga output valve;

a seltzer dispenser adapted to be partially filled by a use with water, and thereafter pressurized with low pressure carbon dioxide gas by interconnection with said low pressure gas output valve, said seltzer dispenser comprising a translucent plastic seltzer bottle for containing gas and liquid and a seltzer discharge valve for selectively outputting seltzer from said bottle, said discharge valve adapted to be threadably coupled to said bottle and comprising:

a low pressure gas inlet valve for pressurizing said bottle;

a low pressure output spout for discharging seltzer from the bottle interior;

a normally blocked communication orifice selectively permitting fluid flow communication between or and said output spout; and, lever valve means normally blocking said communication orifice for actuating said bottle;

said seltzer dispenser further comprising non-fragmenting housing means for shrouding said bottle, said housing means comprising upper and lower halves adapted to be coaxially fitted upon said bottle, and each of said halves comprises elongated inspection slots adapted to expose the interior of said bottle to permit visual inspection thereof;

hose means adapted to be selectively coupled between said low pressure output valve and said low pressure inlet valve to pressurize said bottle;

a plurality of syrup containers, each containing a different flavor of syrup concentrate, for providing a source of syrup to be mixed with seltzer, each of the syrup containers comprising valve means for discharging syrup;

a decorative container for enclosing said pressure vessel, said container comprising a nest area for temporarily storing said hose means; and, rack means adapted to be disposed upon a supporting surface and comprising a pair of compartments for conveniently receiving and storing said source and said seltzer dispenser, and at least one adjacent shelf for conveniently storing one or more of said syrup containers.

45. The system as defined in claim 44 wherein said housing means comprises marker tab means adjacent said inspection slots for establishing proper liquid levels within said bottle prior to gas charging thereof.

46. The system as defined in claim 45 wherein said lower housing half comprises a plurality of lower vent holes for relieving pressure in the event of a burst.

47. The system as defined in claim 44 wherein said seltzer discharge valve comprises an integral base adapted to be threadably coupled to said bottle, an inlet mouth circumscribed by said base, an internally defined reduced diameter collar spaced apart from said mouth and circumscribing said communication orifice, a conical region in fluid flow communication with said communication orifice and surrounded by said collar, a siphon tube extending from said conical region into the interior of said bottle, an annulus defined between said collar and said base, and a gasket adapted to be coupled to said collar for mounting said siphon tube.

48. The system as defined in claim 47 wherein said gasket comprises a flange portion adapted to be received within said annulus for sealing said discharge valve to said bottle.

49. The system as defined in claim 48 wherein said low pressure inlet valve is in fluid flow communication with said siphon tube.

50. The system as defined in claim 49 wherein said low pressure inlet valve has an axis, and said spout has an axis coplanar with said first mentioned axis.

51. The system as defined in claim 50 wherein said seltzer discharge valve has a longitudinal axis, and said low pressure inlet valve axis and said spout axis each intersect said longitudinal axis at an angle of between 50 and 60 degrees.

52. The system as defined in claim 51 wherein said lever valve means comprises a lever disposed above said inlet valve and said spout, means for pivotally mounting said lever, and cam housing means actuated by said lever for selectively blocking and unblocking said communication orifice.

53. The system as defined in claim 52 wherein said discharge valve lever occupies a plane substantially transverse and perpendicular with respect to the plane occupied by the axis of said inlet valve and the axis of said discharge nozzle.

54. The system as defined in claim 47 wherein said regulator valve assembly comprises:

a rigid, generally tubular bottom housing adapted to be threadably coupled to said pressure vessel, said bottom housing internally comprising lower and upper passageways separated from one another by a restriction orifice which permits fluid communication between said upper and lower passageways, a rigid, generally tubular top housing adapted to be threadably coupled to said bottom housing, said top housing comprising a low pressure gas output valve;

internal plunger means for selectively unblocking said restriction orifice, said plunger means comprising piston means operationally slidably disposed in said top housing and stem means slidably received within said upper passageway of said bottom housing; and, internal spring means for normally biasing said piston means toward said low pressure gas output valve.

55. The system as defined in claim 54 wherein said regulator assembly pressure relief means and said high pressure filling valve are fitted into transverse passageways machined into said bottom housing in axial alignment with one another, said transverse passageways disposed in fluid flow communication with said lower passageway defined within said bottom housing.

56. The system as defined within claim 55 wherein said stem means terminates in a reduced diameter portion adapted to contact said restriction orifice, and comprises a passageway for admitting gas from said upper passageway of said bottom housing and venting it above said piston means into fluid flow communication with said low pressure output valve.

57. The system as defined in claim 56 wherein that portion of the interior of said top housing beneath said piston means is vented to atmosphere.

58. A home carbonation system for producing soda water, said system comprising:

a source of high pressure carbon dioxide gas comprising a pressure vessel and a regulator valve assembly associated with said vessel for selectively discharging low pressure carbon dioxide gas, said regulator valve assembly comprising pressure relief means for venting said vessel in response to a predetermined overpressure, a high pressure filling valve for safely recharging said pressure vessel, and a low pressure gas output valve;

a seltzer dispenser adapted to be partially filled by a user with water, and thereafter pressurized with low pressure carbon dioxide gas by interconnection with said low pressure gas output valve, said seltzer dispenser comprising a translucent plastic seltzer bottle for containing gas and liquid and a seltzer discharge valve for selectively outputting seltzer from said bottle, said discharge valve adapted to be threadably coupled to said bottle and comprising:

a low pressure gas inlet valve for pressurizing said bottle;

a low pressure output spout for discharging seltzer from the bottle interior;

a normally blocked communication orifice selectively permitting fluid flow communication between said bottle interior and said output spout; and, lever valve means normally blocking said communication orifice for actuating said bottle;

non-fragmenting housing means for shrouding said bottle, said housing means comprising upper and lower halves adapted to be coaxially fitted upon said bottle, and each of said halves comprises elongated inspection slots adapted to expose the interior of said bottle to permit visual inspection thereof;

59. The system as defined in claim 58 wherein said housing means comprises marker tab means adjacent said inspection slots for establishing proper liquid levels within said bottle prior to gas charging thereof.

60. The system as defined in claim 59 wherein said lower housing half comprises a plurality of lower vent holes for relieving pressure in the event of a burst.

61. The system as defined in claim 58 wherein said seltzer discharge valve comprises an integral base adapted to be threadably coupled to said bottle, an inlet mouth circumscribed by said base, an internally defined reduced diameter collar spaced apart from said mouth and circumscribing said communication orifice, a conical region in fluid flow communication with said communication orifice and surrounded by said collar, a siphon tube extending from said conical region into the interior of said bottle, an annulus defined between said collar and said base, and a gasket adapted to be coupled to said collar for mounting said siphon tube.

62. The system as defined in claim 61 wherein said gasket comprises a flange portion adapted to be received within said annulus for sealing said discharge valve to said bottle.

63. The system as defined in claim 62 wherein said low pressure inlet valve is in fluid flow communication with said siphon tube.

64. The system as defined in claim 62 wherein said low pressure inlet valve has an axis, and said spout has an axis coplanar with said first mentioned axis.

65. The system as defined in claim 64 wherein said seltzer discharge valve has a longitudinal axis, and said low pressure inlet valve axis and said spout axis each intersect said longitudinal axis at an angle of between 50 and 60 degrees.

66. The system as defined in claim 61 wherein said housing means comprises marker tab means adjacent said inspection slots for establishing proper liquid levels within said bottle prior to gas charging thereof.

67. The system as defined in claim 66 wherein said lower housing half comprises a plurality of lower vent holes for relieving pressure in the event of a burst.

68. The system as defined in claim 58 wherein said lever valve means comprises a lever disposed above said inlet valve and said spout, means for pivotally mounting said lever, and cam housing means actuated by said lever for selectively blocking and unblocking said communication orifice.

69. The system as defined in claim 68 wherein said discharge valve lever occupies a plane substantially transverse and perpendicular with respect to the plane occupied by the axis of said inlet valve and the axis of said discharge nozzle.

70. A home carbonation system for producing soda water, said system comprising:

a source of high pressure carbon dioxide gas comprising a pressure vessel and a regulator valve assembly associated with said vessel for selectively discharging low pressure carbon dioxide gas, said regulator valve assembly comprising:

a rigid, generally tubular bottom housing adapted to be threadably coupled to said pressure vessel, said bottom housing internally comprising lower and upper passageways separated from one another by a restriction orifice which permits fluid flow communication between said upper and lower passageways, a rigid, generally tubular top housing adapted to be threadably coupled to said bottom housing, said top housing comprising a low pressure gas output valve;

internal plunger means for selectively unblocking said restriction orifice, said plunger means comprising piston means operationally slidably disposed in said top housing and stem means slidably received within said upper passageway of said bottom housing; and, said bottom housing having pressure relief means for venting said vessel in response to a predetermined overpressure and high pressure filling valve means for safely recharging said pressure vessel;

a seltzer dispenser adapted to be partially filled by a user with water and thereafter pressurized with low pressure carbon dioxide gas by interconnection with said low pressure gas output valve, said seltzer dispenser comprising a translucent plastic seltzer bottle for containing gas and liquid and a seltzer discharge valve for selectively outputting seltzer from said bottle, said discharge valve adapted to be threadably coupled to said bottle and comprising:

a low pressure gas inlet valve for pressurizing said bottle;

a low pressure output spout for discharging seltzer from the bottle interior;

a normally blocked communication orifice selectively permitting fluid flow communication between said bottle interior and said output spout; and, lever valve means normally blocking said communication orifice for actuating said bottle.

71. The system as defined in claim 70 wherein said seltzer dispenser comprises non-fragmenting housing means for shrouding said bottle, said housing means comprising upper and lower halves adapted to be coaxially fitted upon said bottle, and each of said halves comprises elongated inspection slots adapted to expose the interior of said bottle to permit visual inspection thereof.

72. The system as defined in claim 71 wherein said housing means comprises marker tab means adjacent said inspection slots for establishing proper liquid levels within said bottle prior to gas charging thereof.

73. The system as defined in claim 72 wherein said lower housing half comprises a plurality of lower vent holes for relieving pressure in the event of a burst.

74. The system as defined in claim 70 wherein said seltzer discharge valve comprises an integral base adapted to be threadably coupled to said bottle, an inlet mouth circumscribed by said base, an internally defined reduced diameter collar spaced apart from said mouth and circumscribing said communication orifice, a conical region in fluid flow communication with said communication orifice and surrounded by said collar, a siphon tube extending from said conical region into the interior of said bottle, an annulus defined between said collar and said base, and a gasket adapted to be coupled to said collar for mounting said siphon tube.

75. The system as defined in claim 74 wherein said gasket comprises a flange portion adapted to be received within said annulus for sealing said discharge valve to said bottle.

76. The system as defined in claim 70 wherein said low pressure inlet valve has an axis, and said spout has an axis coplanar with said first mentioned axis.

77. The system as defined in claim 76 wherein said seltzer discharge valve has a longitudinal axis, and said low pressure inlet valve axis and said spout axis each intersect said longitudinal axis at an angle of between 50 and 60 degrees.

78. The system as defined in claim 70 wherein said lever valve means comprises a lever disposed above said inlet valve and said spout, means for pivotally mounting said lever, and cam housing means actuated by said lever for selectively blocking and unblocking said communication orifice.

79. The system as defined in claim 78 wherein said discharge valve lever occupies a plane substantially transverse and perpendicular with respect to the plane occupied by the axis of said inlet valve and the axis of said discharge nozzle.

80. The system as defined in claim 70 wherein said regulator assembly pressure relief means and said high pressure filling valve are fitted into transverse passageways machined into said bottom housing in axial alignment with one another, said transverse passageways disposed in fluid flow communication with said lower passageway defined within said bottom housing.

81. The system as defined within claim 80 wherein said stem means terminates in a reduced diameter portion adapted to contact said restriction orifice, and comprises a passageway for admitting gas from said upper passageway of said bottom housing and venting it above said piston means into fluid flow communication with said low pressure output valve.

82. The system as defined in claim 81 wherein that portion of the interior of said top housing beneath said piston means is vented to atmosphere.

83. A regulated source of compressed gas for producing soda water, said source comprising:

a pressure vessel for storing high pressure gas; and, selectively discharging low pressure carbon dioxide gas, said regulator valve assembly comprising:

a rigid, generally tubular bottom housing adapted to be threadably coupled to said pressure vessel, said bottom housing internally comprising lower and upper passageways separated from one another by a restriction orifice which permits fluid flow communication between said upper and lower passageways;

a rigid, generally tubular top housing adapted to be threadably coupled to said bottom housing, said top housing comprising a low pressure gas output valve;

internal plunger means for selectively unblocking said restriction orifice, said plunger means comprising piston means operationally slidably disposed in said top housing and stem means slidably received within said upper passageway of said bottom housing; and, said bottom housing having pressure relief means for venting said vessel in response to a predetermined overpressure and high pressure filling valve means for safely recharging said pressure vessel.

84. The gas source as defined in claim 83 wherein said regulator assembly pressure relief means and said high pressure filling valve are fitted into transverse passageways machined into said bottom housing in axial alignment with one another, said transverse passageways disposed in fluid flow communication with said lower passageway defined within said bottom housing

85. The gas source as defined within claim 83 wherein said stem means terminates in a reduced diameter portion adapted to contact said restriction orifice, and comprises a passageway for admitting gas from said upper passageway of said bottom housing and venting it above said piston means into fluid flow communication with said low pressure output valve.

86. The gas source as defined in claim 85 wherein that portion of the interior of said top housing beneath said piston means is vented to atmosphere.

87. The gas source as defined in claim 83 including a container for aesthetically housing said vessel and said regulator assembly.

88. The gas source as defined in claim 83 wherein including a hose adapted to be coupled to said low pressure gas output valve for delivering gas to a container during charging, and wherein said container comprises a nest for receiving and storing said hose.

* * * * *